(12) United States Patent
Busayarat et al.

(10) Patent No.: US 8,219,854 B2
(45) Date of Patent: Jul. 10, 2012

(54) VALIDATING CONFIGURATION OF DISTRIBUTED APPLICATIONS

(75) Inventors: Sata Busayarat, Redmond, WA (US); Vladimir Pogrebinsky, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 79 days.

(21) Appl. No.: 12/731,051

(22) Filed: Mar. 24, 2010

(65) Prior Publication Data

US 2011/0239055 A1    Sep. 29, 2011

(51) Int. Cl.
G06F 11/00    (2006.01)

(52) U.S. Cl. .................. 714/26; 714/25; 714/33; 714/37

(58) Field of Classification Search ............... 714/3, 4.1, 714/4.4, 25, 26, 33, 37, 38.1, 38.14, 46, 48, 714/57

See application file for complete search history.

(56) References Cited

U.S. PATENT DOCUMENTS

| | | | |
|---|---|---|---|
| 6,678,639 B2 * | 1/2004 | Little et al. ....................... | 714/25 |
| 7,127,506 B1 * | 10/2006 | Schmidt et al. ................. | 714/46 |
| 7,386,839 B1 | 6/2008 | Golender | |
| 7,584,382 B2 | 9/2009 | Verbowski | |
| 2003/0005093 A1 | 1/2003 | Deboer | |
| 2003/0149766 A1 | 8/2003 | Syvanne et al. | |
| 2003/0204791 A1 * | 10/2003 | Helgren et al. ................. | 714/48 |
| 2004/0019670 A1 * | 1/2004 | Viswanath ..................... | 709/223 |
| 2006/0025962 A1 | 2/2006 | Ma | |
| 2006/0026463 A1 * | 2/2006 | Paliwal et al. .................. | 714/37 |
| 2006/0155891 A1 | 7/2006 | Wu | |
| 2006/0195750 A1 | 8/2006 | Deshmukh | |
| 2007/0022119 A1 | 1/2007 | Roy et al. | |
| 2008/0060057 A1 * | 3/2008 | Barchi et al. ..................... | 726/3 |
| 2008/0294587 A1 | 11/2008 | Qu | |
| 2009/0187823 A1 | 7/2009 | Farrell | |
| 2009/0204561 A1 | 8/2009 | Sabato | |
| 2010/0275064 A1 * | 10/2010 | DeCusatis et al. .............. | 714/37 |
| 2011/0208841 A1 * | 8/2011 | Robertson et al. ........... | 709/220 |

OTHER PUBLICATIONS

Wang, Yi-Min, et al., "Persistent-state Checkpoint Comparison for Troubleshooting Configuration Failures" Apr. 4, 2003, 7 pages.
Whitaker, Andrew, et al., "Configuration Debugging as Search: Finding the Needle in the Haystack", USENIX Association OSDI '04: 6th Symposium on Operating Systems Design and Implementation, Year of Publication: 2004, pp. 77-90.
Wang, Helen J., et al., "Automatic Misconfiguration Troubleshooting with PeerPressure" Operating Systems Design and Implementation, Proceedings of the 6th conference on Symposium on Opearting Systems Design & Implementation—vol. 6, Year of Publication: 2004, 13 pages.

* cited by examiner

*Primary Examiner* — Robert Beausoliel, Jr.
*Assistant Examiner* — Joseph D Manoskey
(74) *Attorney, Agent, or Firm* — Workman Nydegger (57) ABSTRACT

The present invention extends to methods, systems, and computer program products for validation configuration of distributed applications. Embodiments of the invention provide a system framework for identifying root causes of configuration errors and best-practice incompliance of distributed applications. The system framework provides both platform provider and customer a powerful and consistent method to create, extend, and utilize a tool that simplifies the configuration troubleshooting experience. Using the system framework, a user is able to access more information about applications and to troubleshoot multiple applications at the same time without having to load or activate any of the applications. In addition, users are able to add custom rules to identify commonly occurring configuration problems.

18 Claims, 4 Drawing Sheets

201
Accessing A Configuration Validation Rule From A Rule Store, The Configuration Validation Rule Configured To Execute Against Configuration Data To Validate An At Least Partial Configuration Of The Application, The Configuration Validation Rule Containing Rule Metadata, Detection Logic, And Resolution Logic, The Rule Metadata Identifying A Configuration Reader, From Among The One Or Configuration Readers, The Configuration Validation Rule Is To Read Configuration Data From, The Detection Logic Indicating How To Detect One Or More Detectable Conditions In Configuration Data Accessed From The Identified Configuration Reader, The Resolution Logic Indicating One Or More Possible Resolutions To The One Or More Detectable Conditions

202
Matching The Accessed Configuration Rule To The Identified Configuration Reader Based On The Configuration Reader Being Identified In The Rule Metadata

203
Accessing A Portion Of Configuration Data From The Identified Configuration Reader

204
Attempting To Validate The At Least Partial Configuration Of The Application By Executing The Detection Logic Against The Accessed Portion Of Configuration Data, Execution Of The Detection Logic Including Attempting To Detect Any Of The One Or More Detectable Conditions The Detection Logic Is Configured To Detect

205
Detecting A Condition, From Among The One Or More Detectable Conditions, In The Accessed Portion Of Configuration Data

206
Presenting At Least The Detected Condition At A User Interface

VALIDATING CONFIGURATION OF DISTRIBUTED APPLICATIONS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some environments, different components of a distributed application reside and different computer systems and interoperate to implement the functionality of the distributed application. Some distributed applications are relatively simple, perhaps having one component at each of two different computer systems. As such, configuring these components to interoperate is also reasonably simply.

However, other distributed applications can be larger, relatively more complex, and highly inter-connected as well as diverse in their implementations and configurations. For example, a distributed application can have components at tens or event hundreds of different computer systems. The flexibility of configuration models that can be used with each component is also relatively extensive. The combination of the number of components and the complexity of their configuration can lead to challenges when attempting to identify and resolve configuration issues for the distributed application. The challenges can be even more difficult when a distributed application is hosted on a sophisticated server product, which supports powerful configuration features, such as, for example, multi-level configuration hierarchy, configuration locking, and delegation.

Some systems provide little, if any assistance, to an application owner when errors occur. Other systems to produce error messages, providing an application developer at least some information when an error occurs. However, even when they exist, these types of error messages are typically not adequate for resolving errors. For example, these types of errors messages may relate only to small number of (or even a single) component(s) of a distributed application. Thus, an application owner must individually active each component to see runtime errors for the component. Accordingly, troubleshooting multiple inter-connected application components is generally a challenging experience.

BRIEF SUMMARY

The present invention extends to methods, systems, and computer program products for validating configuration of distributed applications. A rule engine accesses a configuration validation rule from a rule store. The configuration validation rule is configured to execute against configuration data to validate an at least partial configuration of an application. The configuration validation rule contains rule metadata, detection logic, and resolution logic. The rule metadata identifies at least one configuration reader, from among one or configuration readers, the configuration validation rule is to read configuration data from. The detection logic indicates how to detect one or more conditions in configuration data accessed from the identified configuration reader. The resolution logic represents one or more possible resolutions to the one or more detectable conditions.

The rule engine matches the accessed configuration validation rule to the at least one identified configuration reader based on the at least one configuration reader being identified in the rule metadata. The rule engine accesses a portion of configuration data from the at least one identified configuration reader. The rule engine attempts to validate the at least partial configuration of the application by executing the detection logic against the accessed portion of configuration data. The execution of the detection logic includes attempting to detect any of the one or more conditions the detection logic is configured to detect.

The rule engine detects a condition, from among the one or more conditions, in the accessed portion of configuration data. The rule engine presents at least the detected condition at a user interface. One or more possible resolutions for the detected condition can also be presented with the detected condition.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for validating configuration of distributed applications. A rule engine accesses a configuration validation rule from a rule store. The configuration validation rule is configured to execute against configuration data to validate an at least partial configuration of an application. The configuration validation rule contains rule metadata, detection logic, and resolution logic. The rule metadata identifies at least one configuration reader, from among one or configuration readers, the configuration validation rule is to read configuration data from. The detection logic indicates how to detect one or more conditions in configuration data accessed from the identified configuration reader. The resolution logic represents one or more possible resolutions to the one or more detectable conditions.

The rule engine matches the accessed configuration validation rule to the at least one identified configuration reader based on the at least one configuration reader being identified in the rule metadata. The rule engine accesses a portion of configuration data from the at least one identified configuration reader. The rule engine attempts to validate the at least partial configuration of the application by executing the detection logic against the accessed portion of configuration data. The execution of the detection logic includes attempting to detect any of the one or more conditions the detection logic is configured to detect.

The rule engine detects a condition, from among the one or more conditions, in the accessed portion of configuration data. The rule engine presents at least the detected condition at a user interface. One or more possible resolutions for the detected condition can also be presented with the detected condition.

In some embodiments, a configuration validation rule is configured to execute against a plurality of portions of configuration data to validate an at least partial configuration of an application. Thus, it may be that a rule engine accesses a plurality of portions configuration data from a configuration reader. Alternately or in combination, the rule engine can access a portion configuration data from a plurality of different configuration readers.

For example, the rule engine can read a first portion of configuration data from a first configuration reader. The first portion of configuration data can be in a first format. The rule engine can read a second portion of configuration data from a second configuration reader. The second portion of configuration data can be in a second format.

The first and second portions of configuration data can be read from the same location or from different locations. The first and second formats may be the same format or may be different formats. The application can be a local, stand alone, or distributed application.

The first and second portions of configuration data are merged into a distributed application configuration representing an at least partial configuration of the application. The configuration validation rule is executed against the distributed application configuration to attempt to validate the at least partial configuration of the application. Any detected conditions can be presented, possibly along with potential resolutions to the detected conditions, at a user interface.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
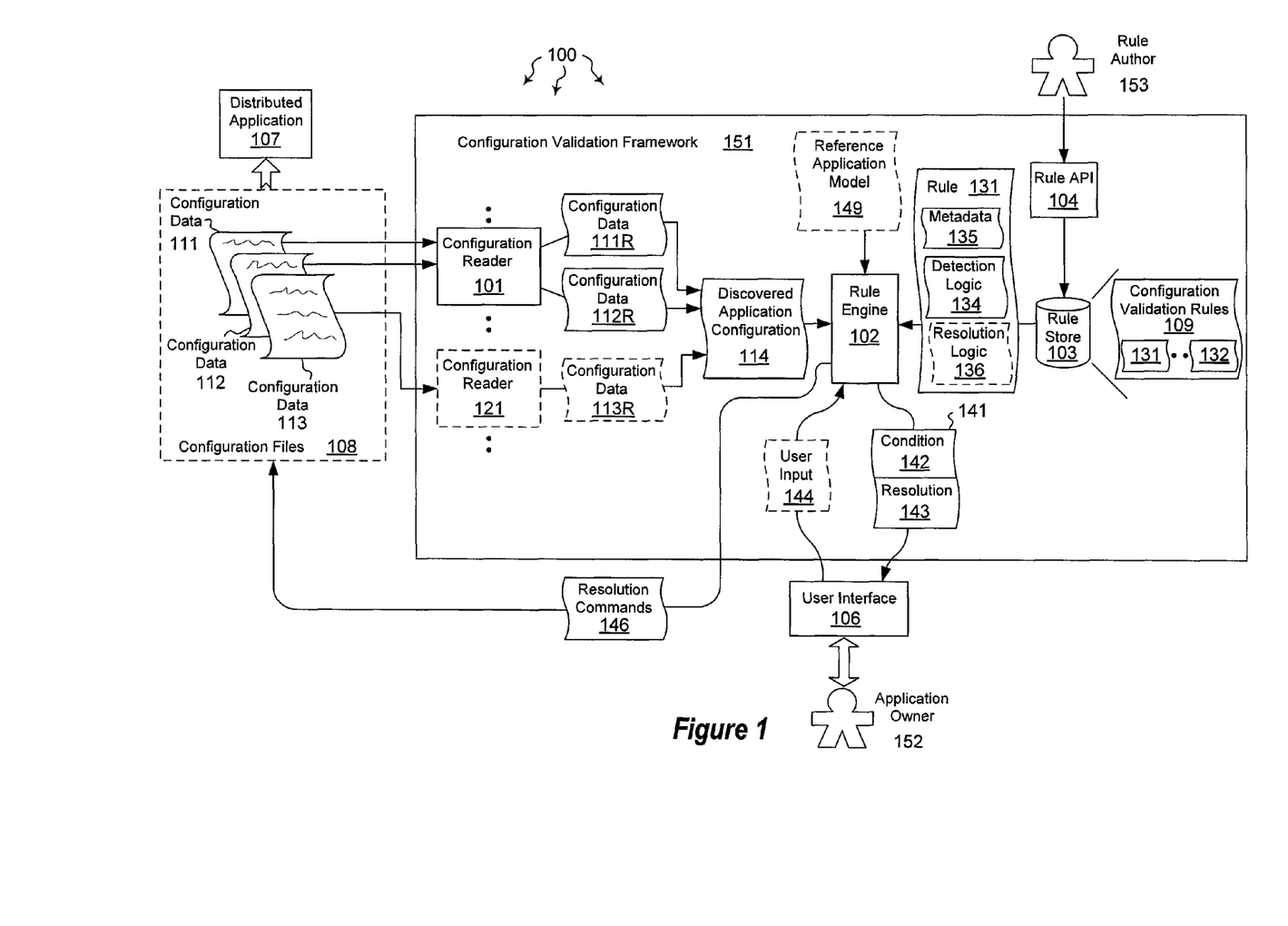
FIG. 1 illustrates an example computer architecture that facilitates validating configuration of distributed applications

FIG. 1 illustrates an example computer architecture 100 that facilitates validating configuration of distributed applications. Referring to FIG. 1, computer architecture 100 includes configuration validation framework 151, further including configuration reader 101, rule engine 102, rule API 104, and rule store 103. Configuration validation framework 151 also optionally includes one or more additional configuration readers including configuration reader 121. Each of the components of configuration validation framework 151 and possibly also user interface 106 can be connected to one another via a system bus of a computer system. Accordingly, the components can communicate with one another over the system bus.

The components of distributed application 107 can be distributed across a plurality, and potentially tens, hundreds, or even thousands, of different computer systems. Configuration files 108 stored configuration data for the different components of distributed application 107. Configuration files 108 can include different portions of configuration data, such as, for example, configuration data 111, 112, and 113, also distributed across a plurality of different computer systems. Different portions of configuration data can be also formatted differently and can be applicable to different components of distributed application 107. For example, configuration data 111 can be in one format and configuration data 112 can be in a second different format.

Thus, components of distributed application 107, different portions of configuration files 108, and configuration validation framework 151 can be connected to one another over (or be part of) a network, such as, for example, a Local Area Network ("LAN"), a Wide Area Network ("WAN"), and even the Internet. Accordingly, components of distributed application 107, different portions of configuration files 108, and configuration validation framework 151 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Distributed application 107 can be a combination of multi-tiered and/or inter-connected applications hosted under the same application server. In some embodiments, distributed application 107 is a Web services/Workflow application. For example, distributed application can be a Windows Communication Foundation ("WCF")/Windows Workflow Foundation ("WF") application hosted on Internet Information Services ("IIS"). In these embodiments, configuration files 108 can contain configuration data for configuring distributed application 107 to operate in an IIS environment. Embodiments of the invention can also be used to validate Web site configuration.

Generally, configuration readers are configured to read differently located and/or differently formatted configuration data from configuration files 108 and convert the differently located and/or differently formatted configuration data into a rule engine format compatible with rule engine 102. Each configuration reader can be configured to convert one or more different configuration data formats into configuration data in the rule engine format. For example, configuration data 111 can be in a first format and configuration data 112 can be in a second different format. Configuration reader 101 can be configured to read configuration data in both the first format and the second different format and convert the configuration data in both the first format and the second different format into configuration data in the rule engine format.

Configuration data 113 can be in a third different format. Configuration reader 101 can also be configured to read configuration data in the third different format and convert the configuration data in the third different format into configuration data in the rule engine format. Alternately, a further configuration reader, such as, for example, configuration reader 121, can be configured to read configuration data in the third different format and convert the configuration data in the third different format into configuration data in the rule engine format.

As such, one or more configuration readers, each configured to read and convert one or more different formats of configuration data can be included in configuration validation framework 151. The one or more configuration readers can also combine different portions of configuration data in the rule engine format together to form a (e.g., distributed) application configuration. The application configuration can represent at least a partial configuration of a (e.g., distributed) application.

In some embodiments, a configuration reader reads one or more portions of configuration data and creates an in-memory view of the application configuration. A configuration reader can use an external configuration Application Program Interface ("API") to read configuration data from a technology-specific configuration system. For example, a configuration reader can use the Microsoft.Web.Administration API for an IIS hosted application.

Generally, rule store 103 stores configuration validation rules 109. Configuration validation rules 109 can contain rules, including configuration validation rules 131, 132, etc, that detect one or more of: syntax errors, semantic errors, and best practice violations in an application configuration. In some embodiments, rule store 103 is extensible and is maintained by rule authors (e.g., rule author 153).

Figure 4:
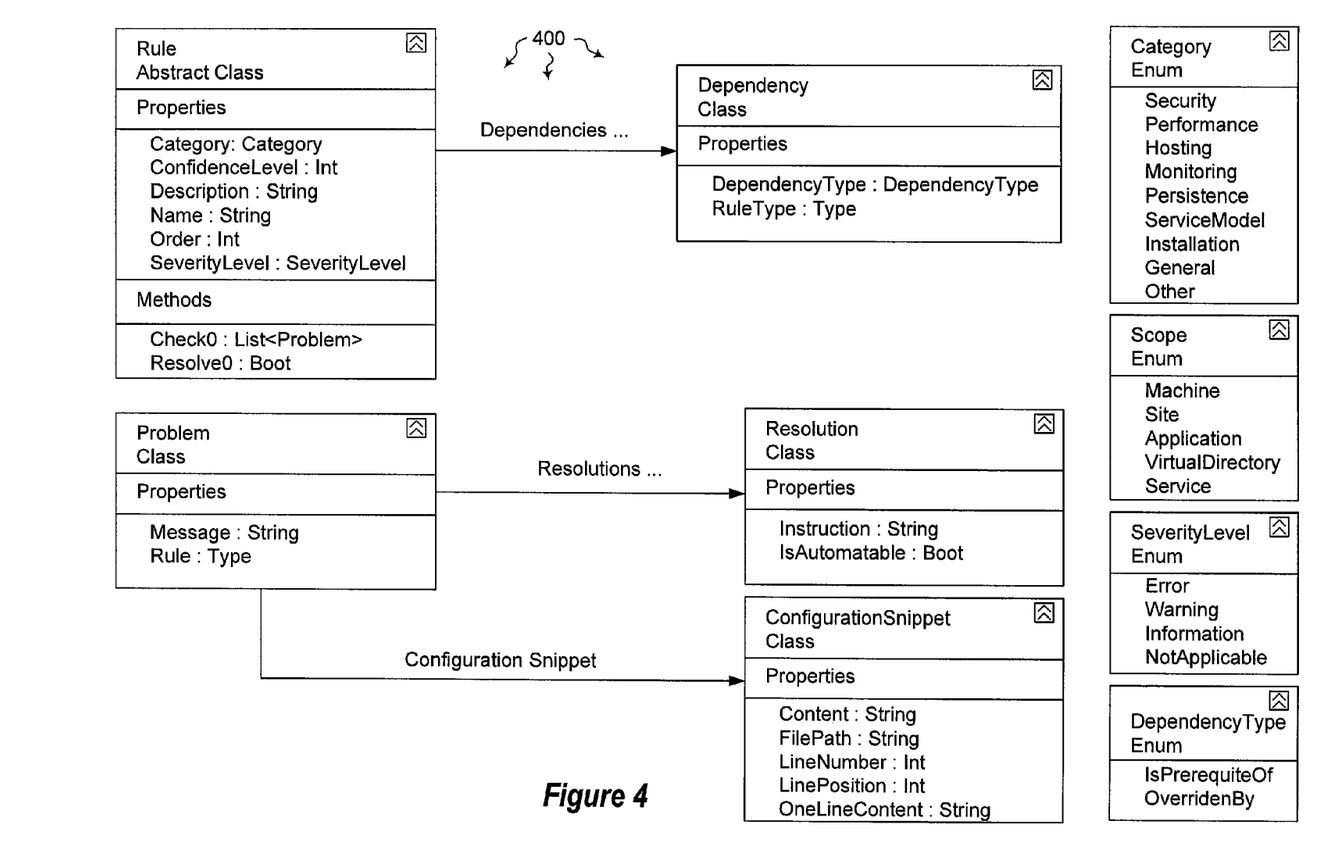
FIG. 4 illustrates an example of a Unified Modeling Language ("UML") class diagram for a rule API.

Rule API 104 can be exposed to rule authors (e.g., rule author 153) to implement new rules. Thus, a public programming interface and its documentation can be exposed to rules authors, such as, system administrators or application developers, to create custom and pluggable validation rules that suit their needs. FIG. 4 illustrates an example of a Unified Modeling Language ("UML") class diagram 400 for a rule API.

Generally, rule engine 102 is configured to receive a distributed application configured and a configuration validation rule. Rule engine 102 applies a configuration validation rule against one or more portions of a distributed application configuration to attempt to validate the configuration of the represented distributed application. In some embodiments, rule engine 102 executed a set of configuration validation rules against a distributed applications configuration and reports detected conditions to a user (e.g., application owner 152).

An application owner or other user can access configuration validation framework 151 via a tool (e.g., user interface 106) that displays the output of rule execution. When appropriate, the tool can also receive user input related to resolving detected conditions. The tool can be integrated with and/or be included in other server management products.

Configuration validation rules generally include at least metadata and detection logic and can also optionally include resolution logic. The metadata contains the static attributes of the rule, such as, for example, name, description, category, severity level, confidence level, problem message template, a list of resolutions and their message templates, etc. The detection logic describes (in code) how a condition is detected. The detection logic also constructs the instances of conditions and resolution messages (there can be multiple resolutions to a problem). Resolution logic describes (in code) how a problem is resolved. In some embodiments, resolution logic automatically resolves a detected condition. In other embodiments, resolution logic can take additional input from a user to facilitate semi-automated resolution.

When appropriate, detected condition messages and resolution messages can be declared as resource string type and keyed to be localizable. Detected condition and resolution messages can also contain substitutable strings so that context-specific messages can be dynamically constructed.

Figure 2:
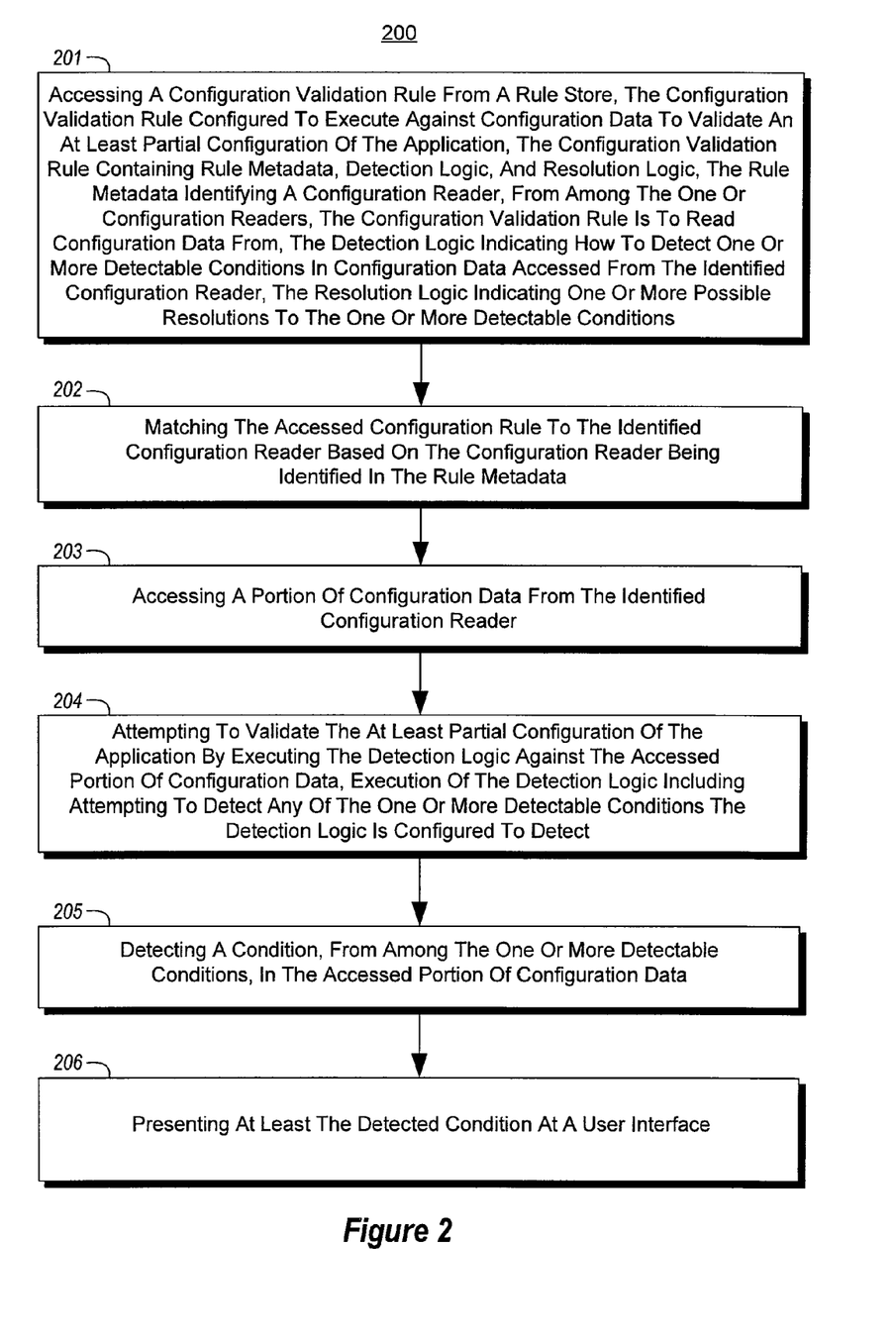
FIG. 2 illustrates a flow chart of an example method for attempting to validate the configuration of a distributed application.

FIG. 2 illustrates a flow chart of an example method 200 for attempting to validate the configuration of a distributed application. Method 200 will be described with respect to the components and data of computer architecture 100.

Method 200 includes an act of accessing a configuration validation rule from the rule store, the configuration validation rule configured to execute against configuration data to validate an at least partial configuration of the application, the configuration validation rule containing rule metadata, detection logic, and resolution logic, the rule metadata identifying at least one configuration reader, from among the one or configuration readers, the configuration validation rule is to read configuration data from, the detection logic indicating how to detect one or more conditions in configuration data accessed from the identified configuration reader, the resolution logic representing one or more possible resolutions to the one or more detectable conditions (act 201). For example, rule engine 102 can access rule 131, configured to execute again configuration data to validate at least a partial configuration of distributed application 107. As depicted, configuration rule 131 includes metadata 135, detection logical 134, and optional resolution logic 136. Metadata 135 identifies at least configuration reader 101 as a configuration reader that rule 131 is to read configuration data from. Detection logic 134 indicates how to detection one o more conditions (e.g., errors, warnings, and informational messages) in configuration data access from configuration reader 101. Resolution logic 136 represents one or more possible resolutions to conditions detected by detection logic 134.

Metadata 135 can describe rule 131 including one or more of what configuration reader(s) to user, a name of rule 131, a description of rule 131, a category for rule 131, a severity level for rule 131, a confidence level for rule 131, a problem message template for rule 131, and a list of resolutions and message templates for resolution.

A severity level can general indicate how detrimental a condition, when detected, is to the operation of a distributed application. Severity levels can include: error, warning, and informational. An error severity level indicates that a detected condition is likely to cause a failure in execution of the distributed application. When a condition with an error severity level is detected, an error message can be output at a client tool, such as, for example, at user interface 106. A warning severity level indicates that a warning is to be given for a detected condition. A warning severity level indicates that a detected condition may cause some type of inappropriate or inefficient operation in the distributed application (but that does not necessarily cause the distributed application to fail). When a condition with a warning severity level is detected, a warning message can be output at a client tool, such as, for example, at user interface 106. An informational severity level indicates that an informational message is to be given for a detected condition (even though failure or inappropriate/inefficient operation is unlikely). When a condition with an informational severity level is detected, an informational message can be output at a client tool, such as, for example, at user interface 106.

Method 200 includes an act of matching the accessed configuration validation rule to the at least one identified configuration reader based on the at least one configuration reader being identified in the rule metadata (act 202). For example, rule engine 102 can match rule 131 to configuration reader 101 based on metadata 135. Method 200 includes an act of accessing a portion of configuration data from the at least one identified configuration reader (act 203). For example, rule engine 102 can access configuration data 111R from configuration reader 101. Configuration validation framework 151 can logically view configuration data 111R as discovered application configuration 114, representing an at least partial configuration of distributed application 107.

Method 200 includes an act of attempting to validate the at least partial configuration of the application by executing the detection logic against the accessed portion of configuration data, execution of the detection logic including attempting to detect any of the one or more conditions the detection logic is configured to detect (act 204). For example, rule engine 102 can attempt to validate at least partial configuration of distributed application 107 by executing detection logic 134 against discovered application configuration 114. Executing detection logic 134 includes attempt to detect any of the one or more conditions detection logic 134 is configured to detect.

In some embodiments, attempting to validate an at least partial configuration includes comparing the at least partial configuration to a reference application model. The reference application model can indicate appropriate syntax and semantics for an application in accordance with best practices. For example, rule engine 102 can compare the at least partial configuration for distributed application 107 to reference application model 149. Reference application module 149 can indicate appropriate syntax and semantics for distributed application 107 in accordance with bests practices that are to be used for distributed application 107.

Method 200 includes an act of detecting a condition, from among the one or more conditions, in the accessed portion of configuration data (act 205). For example, rule engine 102 can detect condition 142 in discovered application configuration 114. Condition 142 can be a syntax error, semantic error, or best-practice violation configuration files 108.

Method 200 includes an act of presenting at least the detected condition at a user interface (act 206). For example, rule engine 102 can present message 141 (e.g., an error, warning, or informational message) at user interface 106. Message 141 includes conditions 142 as well as resolution 143. Resolution 143 represents a possible solution to condition 142.

In some embodiments, resolution 143 takes additional user input. Thus, after sending message 141, rule engine 102 can wait for additional user input. In response to receiving message 141, application owner 152 can enter user input 144 at user interface 106. Rule engine 102 can use user input 144 to implement resolution commands 146.

Alternately, in other embodiments, resolution 143 does not take additional user input. Thus, after sending message 141, rule engine 102 can automatically and without additional user input implement resolution commands 136.

Resolution commands 136 can include editing commands or other commands for correcting identified conditions, such as, for example, correcting or more of: syntax errors, semantic errors, and/or best practice violations in configuration files 108.

In some embodiments, a configuration validation rule is configured to execute against a plurality of portions of configuration data to validate an at least partial configuration of an application. In these embodiments, the rule engine accesses a plurality of portions configuration data from a configuration reader. For example, rule engine 102 can access configuration data 111R and 112R from configuration reader 101. Alternately or in combination, the rule engine can access a portion configuration data from a plurality of different configuration readers. For example, rule engine 102 can access configuration data 113R in combination with one or more of configuration data 111R and 112R.

The plurality of portions of configuration data is merged into a distributed application configuration representing an at least partial configuration of the application. For example, two or more of configuration data 111R, 112R, and 113R can be merged into discovered application configuration 114, representing an at least partial configuration of distributed application 107.

A configuration validation rule is executed against the distributed application configuration to attempt to validate the at least partial configuration of the application. For example, rule 131 is executed against discovered application configuration 114. Any detected conditions can be presented, possibly along with potential resolutions to the detected conditions, at a user interface. For example, message 141 including condition 142 and resolution 143 can be presented at user interface 106. Any resolution commands (e.g., 146) either automated or based on input can be implemented on configuration files 108.

In some embodiments, a configuration validation rule can have dependencies on one or more other configuration validation rules. Thus, some configuration validation rules can be defined in accordance with a parent-child dependency model. One of a variety of different types of dependencies can be defined for a parent-child pair of configuration validation rules. A dependency type can be used to describe the relationship between the parent and child configuration validation rules and how the child configuration validation rule is to be executed based on the parent configuration validation rule's result. Examples of dependency types include:

Is prerequisite of—the child rule is to be executed if the parent rule does not fire.

Overridden by—the child rule is to be executed if the parent rule fires. If the child rule fires, the result from the parent rule's execution is overridden.

Configuration data read or created by a configuration validation rule during its detection can be stored in the cache. As such, any children rules can reuse the configuration data. The cache can be used to isolates the rules' detection logic, reduce code duplication, and improve rule execution performance.

Generally, a rule engine discovers new rules by reading the rule metadata, for example, either from a .Net class attributes (via assembly reflection), or from a dedicated metadata file. The rule engine then creates a rule dependency tree from the metadata. Each node in the tree represents a validation rule and has links to its parents and its children nodes. Each link can have a Dependency Type attribute associated to it.

Configuration validation rule execution order is determined by the rule dependencies (a parent rule is executed before its children). The execution order among sibling configuration validation rules can be determined by an integer metadata attribute, Order. If specified, the sibling configuration validation rules will be executed in the ascending order of the attribute value. Configuration validation rules that take longer time to execute can have higher Order value to reduce the average response time.

Figure 3:
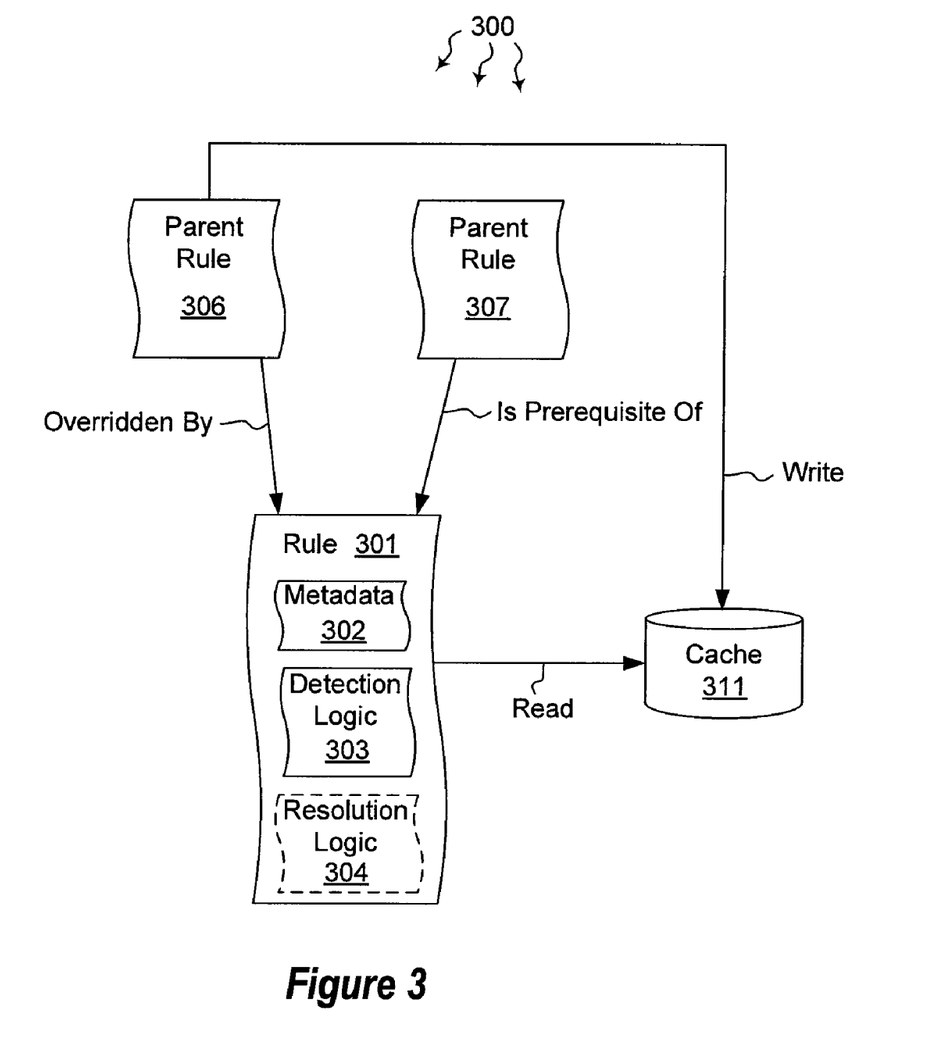
FIG. 3 illustrates an example computer architecture that facilitates using an extensibility and dependency model for configuration validation rules.

FIG. 3 illustrates an example computer architecture 300 that facilitates using an extensibility and dependency model for configuration validation rules. As depicted, computer architecture 300 includes rule 301, parent rule 306, parent rule 307, and cache 311. Rule 301 contains metadata 302, detection logic 303, and resolution logic 304. The dependency of rule 301 on parent rules 306 and 307 can be indicated in metadata 302. In depicted arrangement, rule 301 executes when parent rule 306 is executed and parent rule 307 is not executed. If rule 301 executes, rule 301 overrides results from rule 306. Parent rules 306 and 307 can write data as the result of execution to cache 311. Rule 301 can read data from cache 311 for execution.

Accordingly, embodiments of the invention provide a system framework for identifying root causes of configuration errors and best-practice incompliance of distributed applications. The system framework provides both platform provider and customer a powerful and consistent method to create, extend, and utilize a tool that simplifies the configuration troubleshooting experience. Using the system framework, a user is able to access more information about applications and to troubleshoot multiple applications at the same time without having to load or activate any of the applications. In addition, users are able to add custom rules to identify commonly occurring configuration problems and thus, increase overall productivity in their day-to-day operation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a one or more configuration readers, and a rule store, the rule store containing a plurality of configuration validation rules, each of the one or more configuration readers configured to read configuration data for one or more configuration validation rules from among the plurality of configuration validation rules, a rule engine configured to apply configuration validation rules against configuration data, a method for attempting to validate the configuration of an application, the method comprising:

an act of accessing a configuration validation rule from the rule store, the configuration validation rule configured to execute against configuration data to validate an at least partial configuration of the application, the configuration validation rule containing rule metadata, detection logic, and resolution logic, the rule metadata identifying at least one configuration reader, from among the one or more configuration readers, the configuration validation rule is to read configuration data from, the detection logic indicating how to detect one or more conditions in configuration data accessed from the identified configuration reader, the resolution logic representing one or more possible resolutions to the one or more detectable conditions;

an act of matching the accessed configuration validation rule to the at least one identified configuration reader based on the at least one configuration reader being identified in the rule metadata;

an act of accessing a portion of configuration data from the at least one identified configuration reader;

an act of attempting to validate the at least partial configuration of the application by executing the detection logic against the accessed portion of configuration data, execution of the detection logic including attempting to detect any of the one or more conditions the detection logic;

an act of detecting a condition, from among the one or more conditions, in the accessed portion of configuration data;

an act of presenting at least the detected condition at a user interface; and an act of applying a resolution, from among a presented one or more possible resolutions for the detected condition, based on a resolution policy.

2. The method as recited in claim 1, wherein the act of matching the accessed configuration rule to the at least one identified configuration reader comprises matching the access configuration rule to a first configuration reader and a second different configuration reader;

wherein the act of accessing a portion of configuration data from the at least one identified configuration reader comprises an act of accessing a first portion of configuration data from the first configuration reader and accessing a second portion of configuration data from the second different configuration reader;

further comprising an act of combining the first portion of configuration data and the second portion of configuration data together into a distributed application configuration for use by the configuration validation rule, the distributed application configuration representing the at least a partial configuration of the application; and wherein the act attempting to validate the at least partial configuration of the application by executing the detection logic comprises an act of executing the detection logic against the distributed application configuration.

3. The method as recited in claim 1, wherein the act of accessing a configuration validation rule from the rule store comprises an act of accessing a child configuration validation rule that is dependent on a parent configuration validation rule.

4. The method as recited in claim 3, wherein the act of attempting to validate the at least partial configuration of the distributed application comprises an act of the child configuration validation rule accessing results data from a cache, wherein the results data was written to the cache by the parent configuration validation rule.

5. The method as recited in claim 3, further comprising an act of detecting that the parent configuration validation rule did not execute; and wherein the act of attempting to validate the at least partial configuration of the distributed application comprises an act of attempting to validate the at least partial configuration of the distributed application in response to detecting that the parent configuration validation rule did not execute.

6. The method as recited in 1 claim, further comprising prior to accessing a configuration validation rule from the rule store, an act of a rule author entering the configuration validation rule through a rule Application Program Interface ("API") for storage in the rule store.

7. The method as recited in claim 1, wherein the act of attempting to validate the at least partial configuration of the application by executing the detection logic comprises an act of comparing the at least partial configuration to a reference application model.

8. The method as recited in claim 1, wherein the act of detecting a condition comprises an act of detecting one or a syntax error, semantic error, or best practices violation in the one or more portions of configuration data.

9. The method as recited in claim 1, wherein the act of detecting a condition comprises an act of detecting one of: a condition indicative of an error in a distributed application configuration, a condition that warrants a warning with respect to the distributed application configuration, and a condition that warrants providing information about the distributed application configuration.

10. The method as recited in claim 1, wherein the act of applying a resolution, from among the one or more presented possible resolutions, for the detected condition comprises an act of automatically editing a portion of configuration data to correct one or more of: a syntax error, a semantic error, and a best practice violation.

11. The method as recited in claim 1, wherein the act of applying a resolution for the detected condition based on a resolution policy comprises an act of applying the resolution for the detected condition based on an always apply resolution policy, the always apply resolution policy defining that resolutions are to be automatically applied for conditions detected by any configuration validation rule.

12. The method as recited in claim 1, wherein the act of applying a resolution for the detected condition based on a resolution policy comprises an act of applying the resolution based on the resolution policy defining that resolutions are to be automatically applied only for conditions detected by the accessed configuration validation rule.

13. The method as recited in claim 1, wherein the act of presenting at least the detected condition comprises an act of presenting the detection condition along with a possible resolutions to detected condition, possible resolution requesting user input relating to resolving the detected condition;

further comprising an act of receiving user input related to correcting the detected condition prior to applying a resolution for the detected condition; and wherein the act of applying a resolution for the detected condition comprises an act of the resolution logic using the user input to resolve the detected condition.

14. A computer program product for use at a computer system, the computer system including a one or more configuration readers, and a rule store, the rule store containing a plurality of configuration validation rules, each of the one or more configuration readers configured to read configuration data for one or more configuration validation rules from among the plurality of configuration validation rules, the rule engine configured to apply configuration validation rules against configuration data, the computer program product for implementing a method for attempting to validate the configuration of an application, the computer program product comprising one or more computer storage media having stored thereon computer executable instructions that, when executed at a processor, cause the computer system to perform the method, including the following:

access a configuration validation rule from the rule store, the configuration validation rule configured to execute against configuration data to validate an at least partial configuration of the application, the configuration validation rule containing rule metadata, detection logic, and resolution logic, the rule metadata identifying at least one configuration reader, from among the one or more configuration readers, the configuration validation rule is to read configuration data from, the detection logic indicating how to detect one or more conditions in configuration data accessed from the identified configuration reader, the resolution logic representing one or more possible resolutions to the one or more detectable conditions;

match the accessed configuration validation rule to the at least one identified configuration reader based on the at least one configuration reader being identified in the rule metadata;

access a portion of configuration data from the at least one identified configuration reader; and attempt to validate the at least partial configuration of the application by executing the detection logic against the accessed portion of configuration data, execution of the detection logic including attempting to detect any of the one or more conditions the detection logic;

detect a condition, from among the one or more conditions, in the accessed portion of configuration data;

present the detected condition along with one or more possible resolutions for the detected condition; and apply a resolution, from among the presented one or more possible resolutions for the detected condition, based on a resolution policy.

15. The computer program product as recited in claim 14, wherein computer executable instructions that, when executed, cause the computer system to detect a condition from among the one or more conditions in the accessed portion of configuration data further comprise computer executable instructions that, when executed at a processor, cause the computer system to detect a condition selected from among an error, a warning, and an informational message.

16. The computer program product as recited in claim 14, wherein computer executable instructions that, when executed, cause the computer system to access a configuration validation rule from the rule store comprise computer executable instructions that, when executed, cause the computer system to access a child configuration validation rule that is dependent on a parent configuration validation rule.

17. The computer program product as recited in claim 14, further comprising computer executable instructions that, when executed, cause the computer system to automatically applying a resolution, from among the presented one or more possible resolutions, for the detected condition.

18. A system for validating the configuration of distributed applications, the system comprising one or more processors and system memory, the system also including a one or more configuration readers, and a rule store, the rule store containing a plurality of configuration validation rules, each of the one or more configuration readers configured to read configuration data for one or more configuration validation rules from among the plurality of configuration validation rules, a rule engine configured to apply configuration validation rules against configuration data, and the system comprising computer-executable instructions which, when executed, perform a method for attempting to validate the configuration of an application comprising:

accessing a configuration validation rule from the rule store, the configuration validation rule configured to execute against configuration data to validate an at least partial configuration of the application, the configuration validation rule containing rule metadata, detection logic, and resolution logic, the rule metadata identifying at least one configuration reader, from among the one or configuration readers, the configuration validation rule is to read configuration data from, the detection logic indicating how to detect one or more conditions in configuration data accessed from the identified configuration reader, the resolution logic representing one or more possible resolutions to the one or more detectable conditions;

matching the accessed configuration validation rule to the at least one identified configuration reader based on the at least one configuration reader being identified in the rule metadata;

accessing a portion of configuration data from the at least one identified configuration reader;

attempting to validate the at least partial configuration of the application by executing the detection logic against the accessed portion of configuration data, execution of the detection logic including attempting to detect any of the one or more conditions the detection logic;

detecting a condition, from among the one or more conditions, in the accessed portion of configuration data;

presenting at least the detected condition at a user interface; and applying a resolution, from among a presented one or more possible resolutions for the detected condition, based on a resolution policy.

* * * * *